United States Patent
George et al.

(10) Patent No.: US 9,878,675 B2
(45) Date of Patent: Jan. 30, 2018

(54) RAMP BRACKET

(71) Applicant: Ford Global Technologies, LLC, Dearborn, MI (US)

(72) Inventors: Timothy George, Tecumseh (CA); Kurt John Jaeckle, St. Clair Shores, MI (US); Mark Higgins, Grosse Pointe Woods, MI (US); Matthew Naumann, Ankeny, IA (US); Jeffrey Gerard Fortin, Birmingham, MI (US); John Robert Dryden, Melvindale, MI (US); John Jeffrey Steslicki, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/316,097

(22) Filed: Jun. 26, 2014

(65) Prior Publication Data

US 2015/0375686 A1 Dec. 31, 2015

(51) Int. Cl.
| | |
|---|---|
| *B60R 9/02* | (2006.01) |
| *B60R 9/06* | (2006.01) |
| *F16M 13/02* | (2006.01) |
| *B60P 7/08* | (2006.01) |
| *B60P 1/44* | (2006.01) |
| *B60P 1/43* | (2006.01) |

(52) U.S. Cl.
CPC .............. *B60R 9/02* (2013.01); *B60P 1/435* (2013.01); *B60P 1/44* (2013.01); *B60R 9/06* (2013.01); *F16M 13/02* (2013.01); *B60P 7/0807* (2013.01)

(58) Field of Classification Search
CPC ........... B60P 1/43; B60P 1/435; B60P 7/0815; B62D 33/03; B60R 9/02; B60R 9/06; B60R 7/0807; B60R 7/0815; F16M 13/02

USPC ...... 248/200.1, 223.31, 222.41, 225.11, 211, 248/316.7; 296/37.6, 51, 61, 39.2, 39.1, 296/183.1; 410/104, 106, 110, 112, 142, 410/144

See application file for complete search history.

(56) References Cited

U.S. PATENT DOCUMENTS

| | | | | |
|---|---|---|---|---|
| 4,955,771 | A * | 9/1990 | Bott | B60P 7/14 410/104 |
| 6,575,516 | B2 * | 6/2003 | Webber | B60P 1/43 14/69.5 |
| 6,913,305 | B1 * | 7/2005 | Kern | B62D 33/03 296/51 |
| 7,014,400 | B1 * | 3/2006 | LaBelle | B60P 7/0815 410/104 |
| 7,344,184 | B2 | 3/2008 | Salvador et al. | |

(Continued)

OTHER PUBLICATIONS

Photograph of F-150 SuperCrew Lariat FX4 Sport Ramp Racks, http://pickuptrucks.com/2014/01/that's-a-warp-2014-detroit-auto-show-highlights.html.

*Primary Examiner* — Tan Le

(74) *Attorney, Agent, or Firm* — Jason C. Rogers; Brooks Kushman P.C.

(57) ABSTRACT

A ramp bracket assembly for selectively storing a ramp in a rear of the vehicle is disclosed. The ramp bracket includes a mounting plate, a support plate, and a retaining channel. The mounting plate is spaced away from and fixedly connected to the support plate. The mounting plate further includes a key member that engages with a mounting bracket connectable to the vehicle sidewall. The retaining channel, which selectively receives a ramp, is fixedly connected to the support plate.

17 Claims, 13 Drawing Sheets

(56) References Cited

U.S. PATENT DOCUMENTS

| | | | | |
|---|---|---|---|---|
| 7,473,062 B2 * | 1/2009 | Laflamme | ............ | B60P 7/0892 |
| | | | | 410/108 |
| 7,874,774 B2 * | 1/2011 | Peterson | ............... | B60P 7/0815 |
| | | | | 410/104 |
| 8,657,542 B2 * | 2/2014 | Liu | ....................... | B60P 7/0815 |
| | | | | 410/104 |
| 8,827,343 B2 * | 9/2014 | Peters | ..................... | B60P 1/435 |
| | | | | 296/37.6 |
| 8,857,880 B2 * | 10/2014 | Kalergis | ................... | B60P 1/43 |
| | | | | 224/403 |
| 2009/0044729 A1 * | 2/2009 | Navarre | ................... | B60P 1/43 |
| | | | | 108/44 |
| 2012/0139281 A1 * | 6/2012 | Cousino | ............ | B62D 33/0273 |
| | | | | 296/61 |
| 2013/0134733 A1 | 5/2013 | Peters | | |
| 2014/0064896 A1 | 3/2014 | Parmar | | |
| 2015/0375686 A1 * | 12/2015 | George | .................... | B60R 9/02 |
| | | | | 248/201 |

* cited by examiner

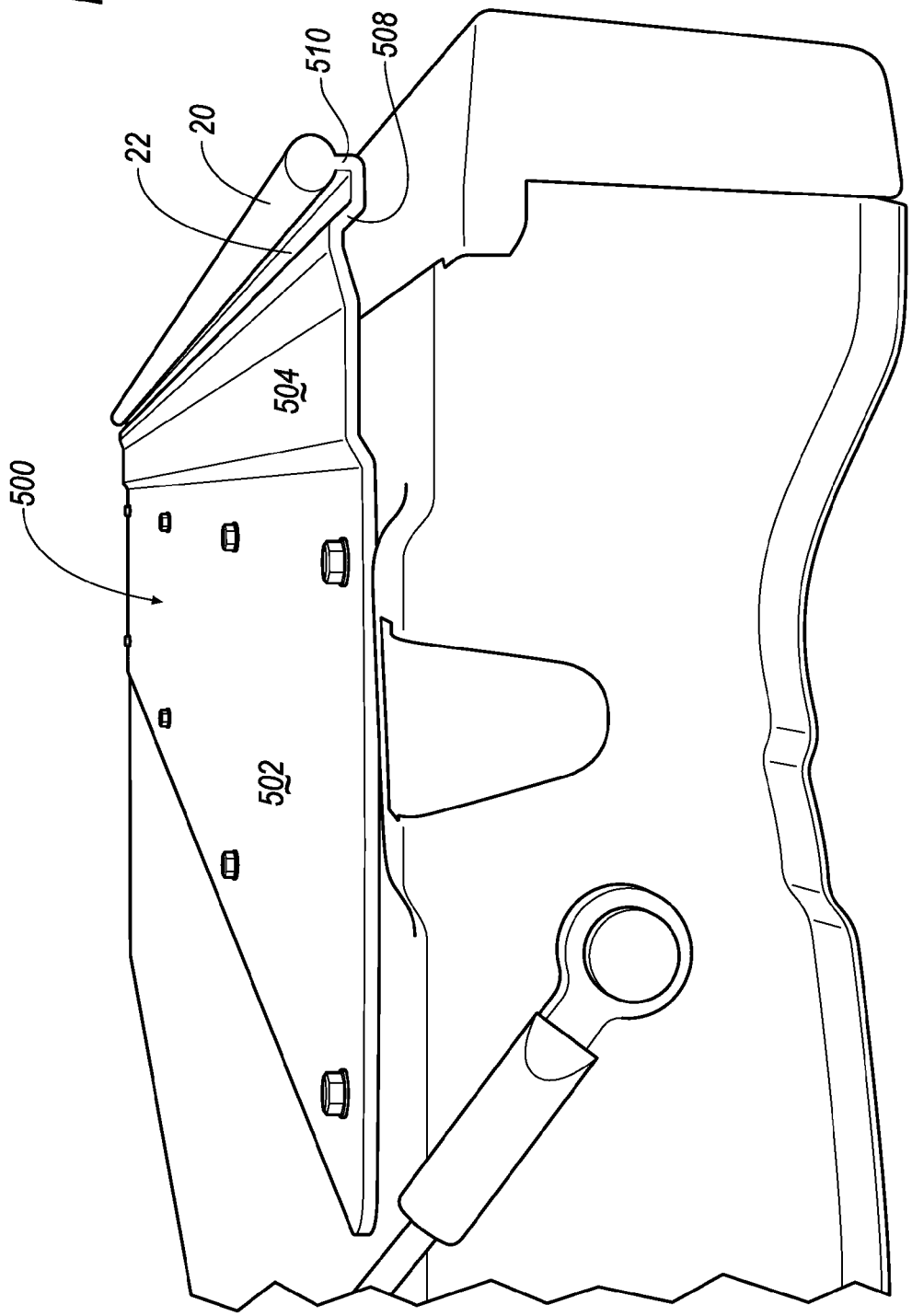

RAMP BRACKET

TECHNICAL FIELD

This disclosure relates generally to vehicle accessories, and more specifically to an arrangement for selectively securing and storing ramp members in a vehicle.

BACKGROUND

Vehicles, such as pick-up trucks, are commonly employed with a cargo box or bed that may be used to transport various items, such as smaller wheeled vehicles. Examples of such vehicles include motorcycles, snowmobiles, all-terrain vehicles (ATVs), four-wheelers (quads), as well as garden and lawn tractors. However, the distance between a floor of a truck bed and the ground is often problematic in loading heavy items, such as the smaller wheel vehicles, as the distance is normally too great to drive the wheeled vehicle directly into the cargo space. To address this issue, it is known to use ramps to bridge the distance between the ground and the truck bed by forming a durable support structure to drive or move heavy objects, such as wheeled vehicles, up and into the cargo space.

Traditionally, when a driver wants to load a wheeled vehicle into the truck bed, he or she releases a tailgate then extends a pair of ramps between the truck bed and the ground. The ramps have a connection end seated against the tailgate at one end and a loading end positioned against the ground, creating about a 45 degree or smaller angle with the ground. Once the ramps are in place, the driver loads the wheel vehicle into the bed of the truck along the ramps. However, in many known connection arrangements of the ramps to the tailgate, the configuration of the connection end of the ramps limit the placement of the loading end of the ramps to ensure that the connection of the ramp is stable for purposes of loading. For example, many known ramp connections prohibit the ramp from being placed at an angle greater than 60 degrees with respect to the ground as the connection end of the ramp become unseated from the tailgate, or simply lift off of the tailgate.

Further, a wheeled vehicle (or other heavy equipment) can take up much of the room in the truck bed, leaving little room for additional materials to be stored in the truck bed. However, it is important to take the ramps to the next location so that the driver can unload the wheeled vehicle or other heavy items. Simply laying the ramps in the truck bed or partially on the cargo in the truck bed can be problematic. For example, during transport, if unsecured, the ramps can fall off the truck and become lost, or the ramps can move around inside of the truck bed and damage the equipment being transported or even damage the ramps themselves. Therefore, storage of the ramps is an issue.

Therefore there is a need for an improved ramp assembly that provides a stable connection in a variety of positions, as well as a need for an improved storage of the ramps when not in use.

SUMMARY

Ramp bracket assemblies for selectively storing a ramp in a rear of the vehicle are disclosed. Each ramp bracket includes a mounting plate, a support plate, and a retaining channel. The mounting plate is spaced away from and fixedly connected to the support plate. The mounting plate further includes a key member that engages with a mounting bracket connectable to the vehicle sidewall. The retaining channel, which selectively receives a ramp, is fixedly connected to the support plate.

In another example, a ramp bracket assembly comprises a pair of mounting brackets and a pair of ramp brackets. Each mounting bracket has a keyway connected to a vehicle sidewall. Each ramp bracket comprises a mounting plate, a support plate and a retaining channel. The mounting plate is fixedly connected to the support plate. The mounting plate has a key that engages with the keyway. The support plate further includes a connection member.

The retaining channel is fixedly connected to the support plate and receives a ramp therein. The retaining channel cooperates with the connection member to selectively secure the ramp to the ramp bracket.

BRIEF DESCRIPTION OF THE DRAWINGS

FIG. 11 is a partial side elevational view of a tailgate of a pick-up truck with a connection rail panel attached thereto;

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
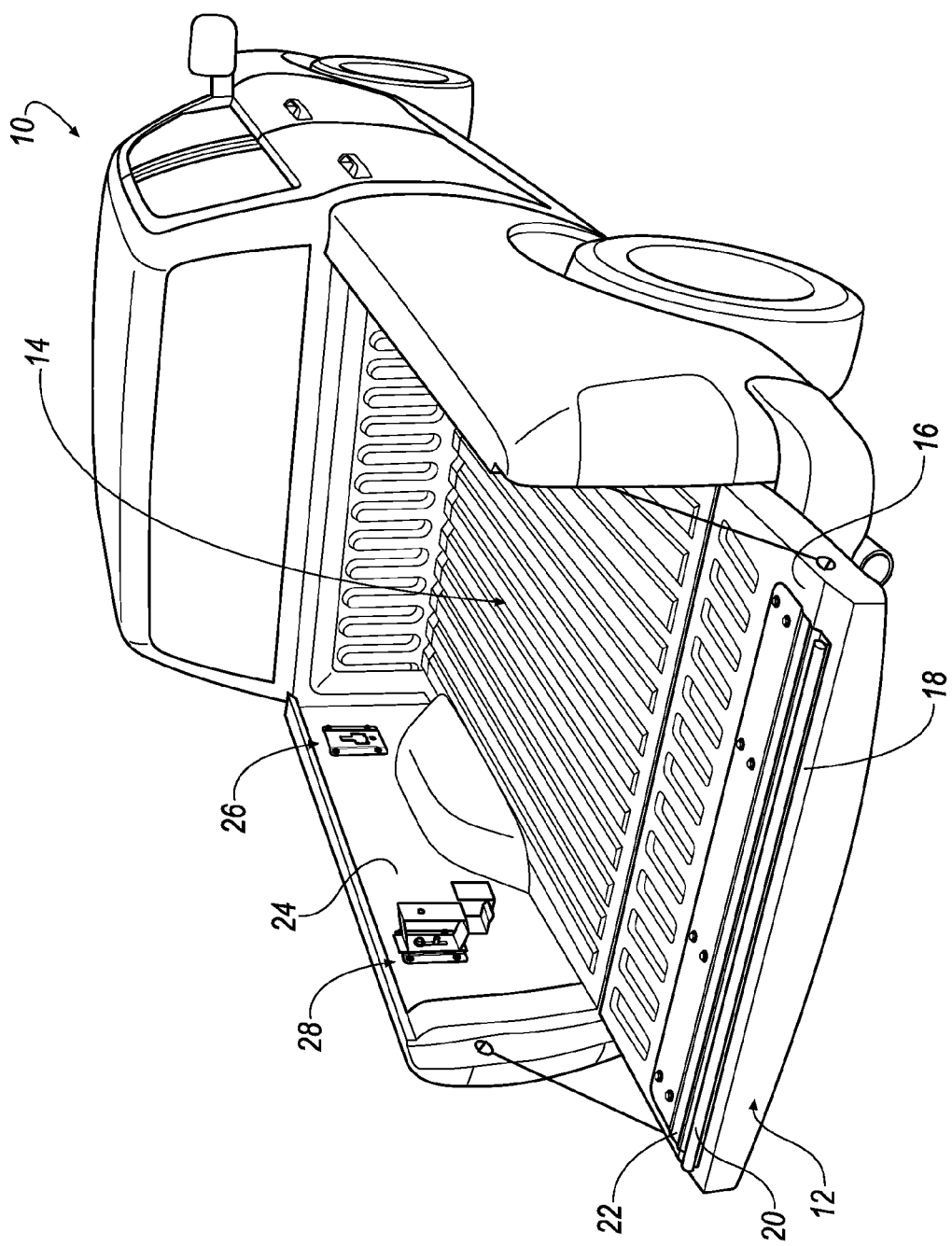
FIG. 1 is a rear right perspective view of a pick-up truck with a tailgate in an open position.

Referring to FIG. 1, a pick-up truck 10 is shown with a tailgate 12 in an open position that provides ingress to a cargo area 14. The tailgate 12 includes an inner panel 16 and a panel member 18 that is attached to the inner panel 16. Panel member 18 further includes a connection rail 20 and an access groove 22. Details of the connection rail 20 and access groove 22 will be discussed below in further detail.

Positioned on either sidewall 24 are a pair of mounting brackets 26. Mounting brackets 26 each receive a ramp bracket 28 that is configured for selectively storing a ramp member 30 within cargo area 14. While at least four mounting brackets 26 and ramp brackets 28 are described, it is understood that only a single pair of mounting brackets 26 and ramp brackets 28 may be provided on one vehicle sidewall 24.

Figure 2:
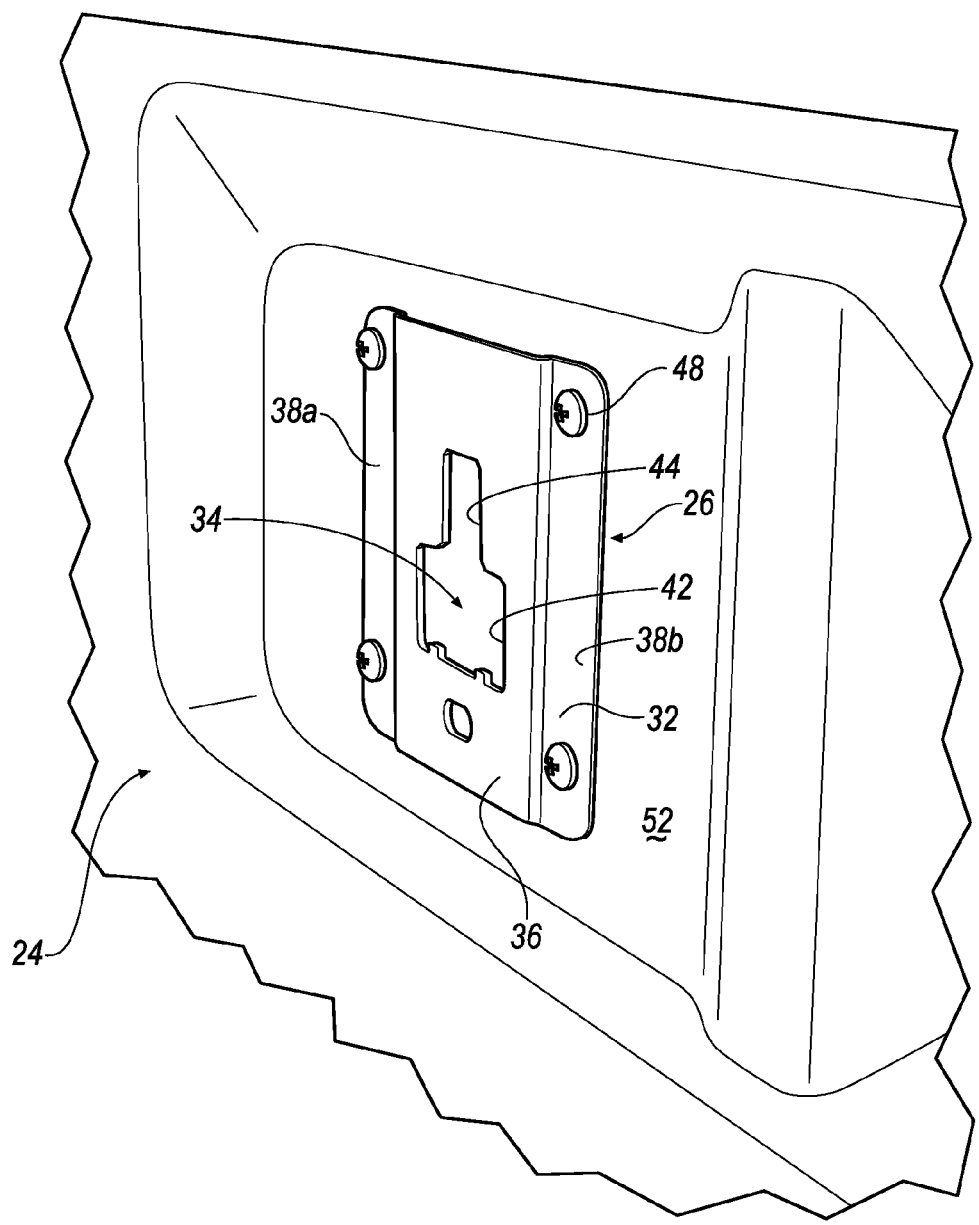
FIG. 2 is a partial perspective view of a sidewall of a pick-up truck, illustrating a mounting bracket connected thereto.

Referring to FIG. 2, details of each the mounting bracket 26 will now be discussed. Each mounting bracket 26 comprises a base member 32 in which a mounting keyway 34 is formed. In one arrangement, the mounting keyway 34 is formed in a central section 36 that may be raised with respect to the flange members 38a, 38b on either side. This arrangement allows a mating key member 40 (best seen in FIGS. 3-6), which is moveably secured on a portion of the ramp bracket 28, to be received within the mounting keyway 34 and be moved into a securing position (best seen in FIG. 6) to secure the ramp bracket 28 to the sidewall 24. In one example, the mounting keyway 34 includes a first open section 42 that is in communication with the second open section 44. The second open section 44 is sized to be smaller than the first open section 42.

Figure 3:
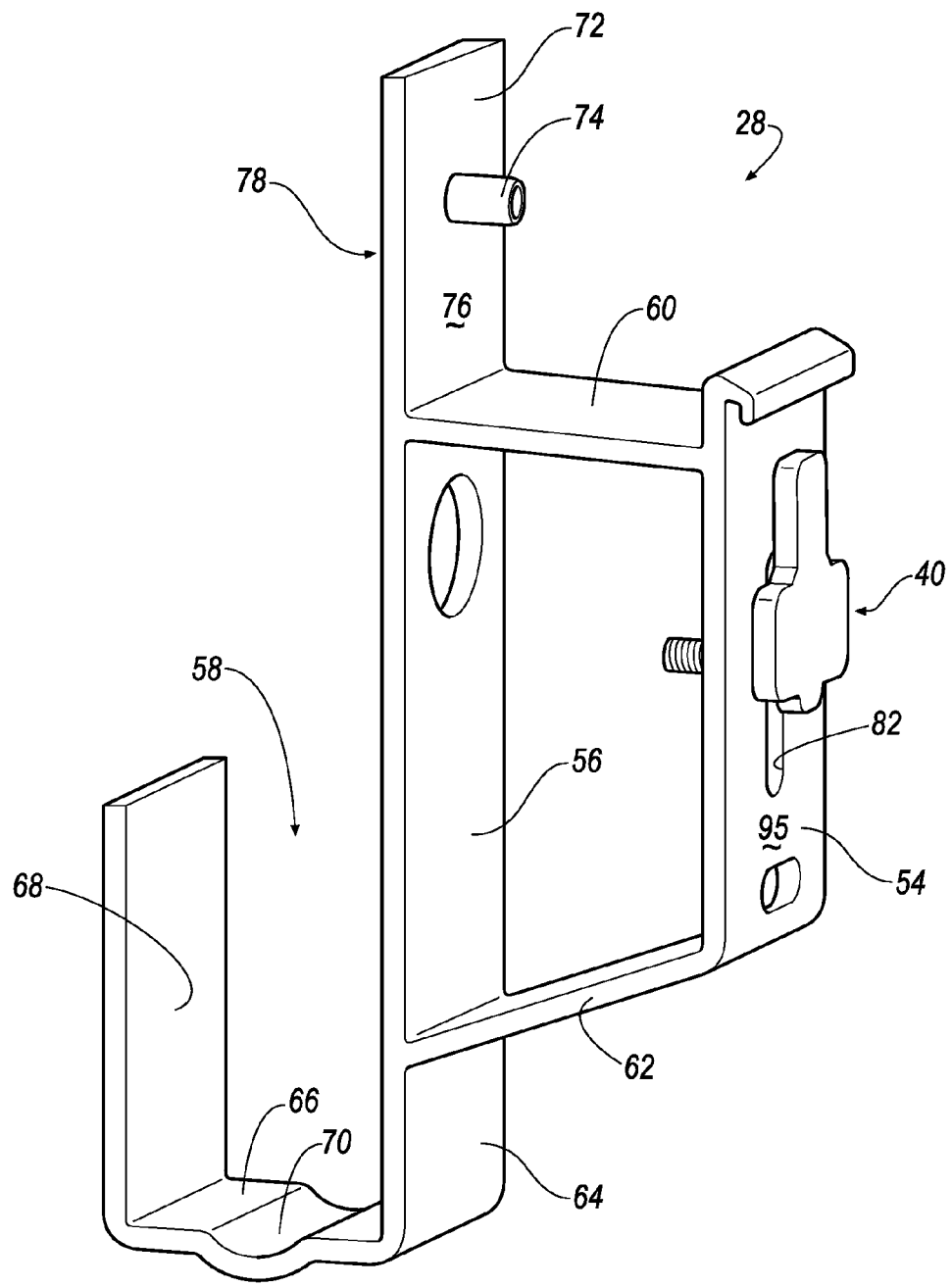
FIG. 3 is a perspective view of a first configuration of a ramp bracket for selectively storing a ramp member in a pick-up truck.

As shown in FIG. 3, mating key member 40 is formed with a complementary shape as mounting keyway 34. For example, mating key member 40 includes a first mount member 46 that is connected to a second mount member 48. The second mount member 48 is sized to be smaller than the first mount member 46. It is understood that the mounting keyway 34 and mating key member 40 arrangements are merely exemplary, and that other mating shape arrangements are also contemplated.

As shown in FIG. 2, each mounting bracket 26 may be fixedly secured to a portion of a pick-up truck sidewall 24. More specifically, the flange members 38a, 38b may be secured to the pick-up truck sidewall 24 by fasteners elements 48 that extend through fastener openings 50 (best seen in FIG. 6). Once secured, a clearance is created between an inner surface 96 of the mounting bracket 26 and an external surface of the sidewall 24. To further maximize space in the cargo area 14, the sidewall 24 may further include recessed areas 52 into which mounting brackets 26 are positioned.

Figure 4:
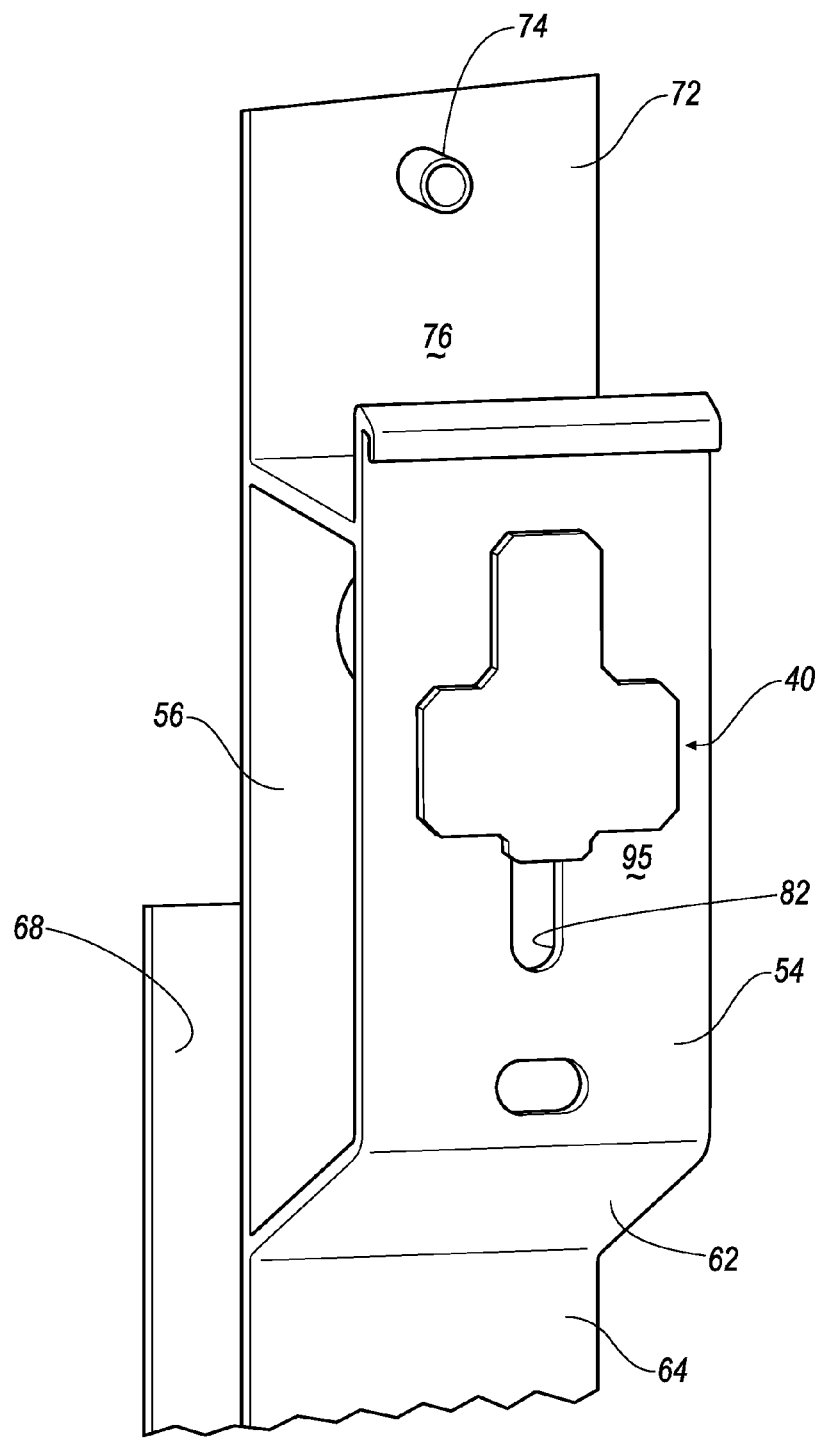
FIG. 4 is a partial perspective view of the ramp bracket of FIG. 3, illustrating a connection element thereof.
Figure 5:
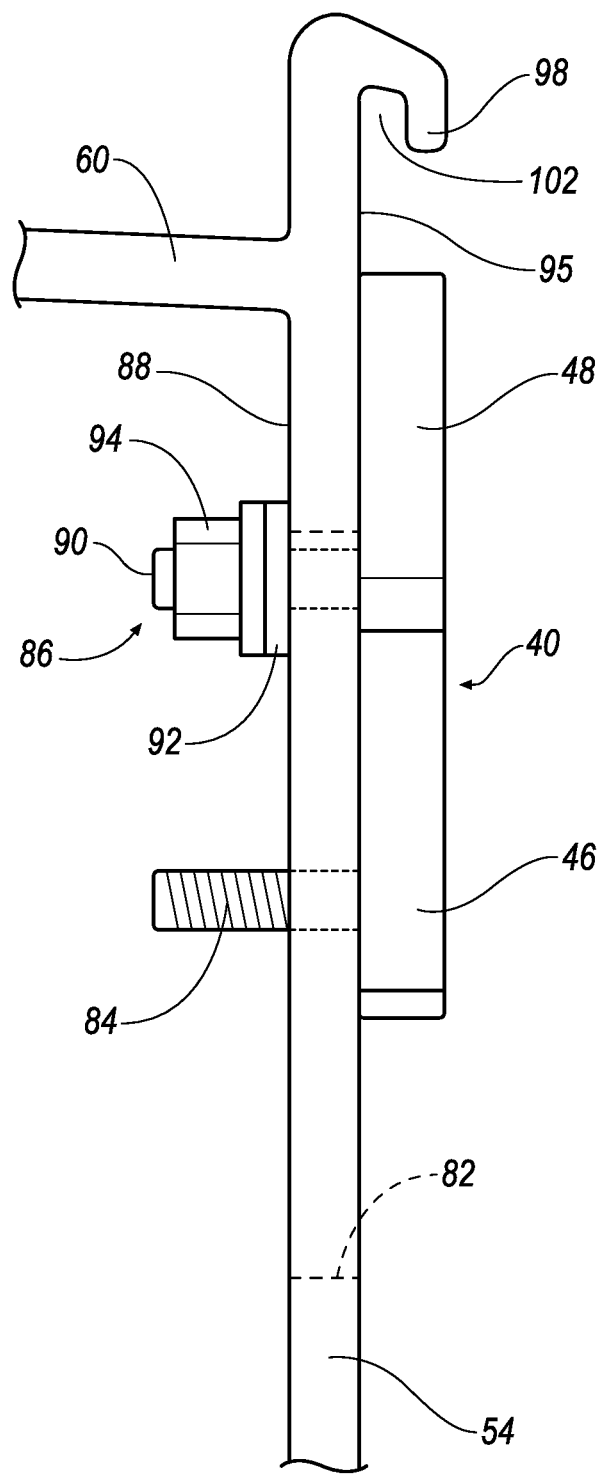
FIG. 5 is a partial side elevational view of a mounting plate of the ramp bracket of FIG. 3.

Referring to FIGS. 3-4, a first example of a ramp bracket 28 is illustrated. Ramp bracket 28 comprises a mounting plate 54, a support plate 56, and a retaining channel 58. The mounting plate 54 is secured to support plate 56 by a first connection member 60 and a second connection member 62 that is spaced from the first connection member 60. The retaining channel 58 is defined a first portion 64 of the support plate 56 that extends below the second connection member 62, a support element 66 that extends from the first portion 64 of the support plate 56, and an upwardly extending retaining plate 68 that is connected to the support plate 56. The retaining plate 68 is arranged to be generally parallel to the support plate 56. The support element 66 may further include a locating groove 70 formed in the top surface of the support element 66. The locating groove 70 is configured for receiving a portion of a ramp member 30.

The support plate 56 may further include a second portion 72 that extends above the first connection member 60. A connection element 74 may be secured to a first face 76 of the second portion 72. An opening (not shown) is formed through the second face 78 and is in communication with the connection element 74. Connection element 74 cooperates with a fastener element 308 (best seen in FIG. 8) to secure a ramp member 30 to the ramp bracket 28, as will be discussed in further detail below.

The mounting plate 54 includes a slot 82 formed therethrough. A locating element 84 and a securing element 86 is secured to the mating key member 40. The locating and securing elements 84, 86 extend through slot 82 and extends past an inside surface 88 of the mounting plate 54. The securing element 86 includes a fastener, such as a screw 90, a washer 92 and a securing nut 94.

Figure 6:
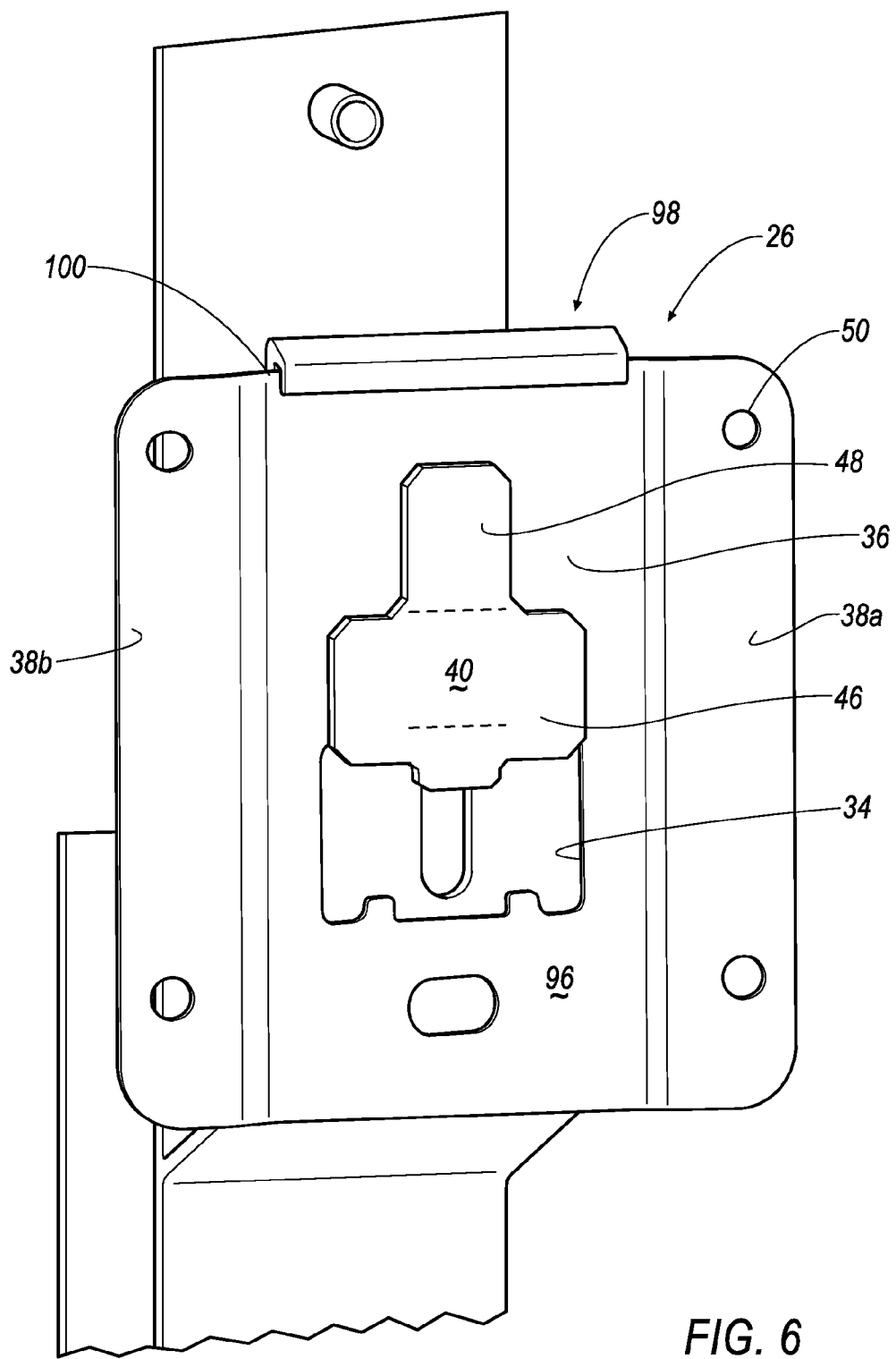
FIG. 6 is an elevational view of the connection element of the ramp bracket selectively secured to the mounting bracket of FIG. 2.

To fasten the ramp bracket 28 to the mounting bracket 26, the securing nut 94 is loosened such that the mating key member 40 may be selectively slid along the slot 82 in the mounting plate 54. While the mating key member 40 is loosely connected to the mounting plate 54 (or separated from the mounting plate 54), the mating key member 40 is extended into the mounting keyway 34 of the mounting bracket 26. The mating key member 40 is then moved away from an engagement surface 95 of the mounting plate 54 and slid upwardly along the slot 82, until the first mount member 46 is at least partially out of alignment with the first open section 42 (as shown in FIG. 6). A gripping lip 98 that is formed as part of the mounting plate 54 engages over a top edge 100 of the mounting bracket 26 and engages an inner surface 96 of the mounting bracket 26. The gripping lip 98 extends outwardly from the engagement surface 95 of the mounting plate 54, forming a channel 102 into which the mounting plate 54 extends. Once the gripping lip 98 and the key member 40 positive so as to engage the mounting bracket 26, the securing nut 94 is tightened, thereby frictionally securing the ramp bracket 28 to the mounting bracket 26.

Figure 7:
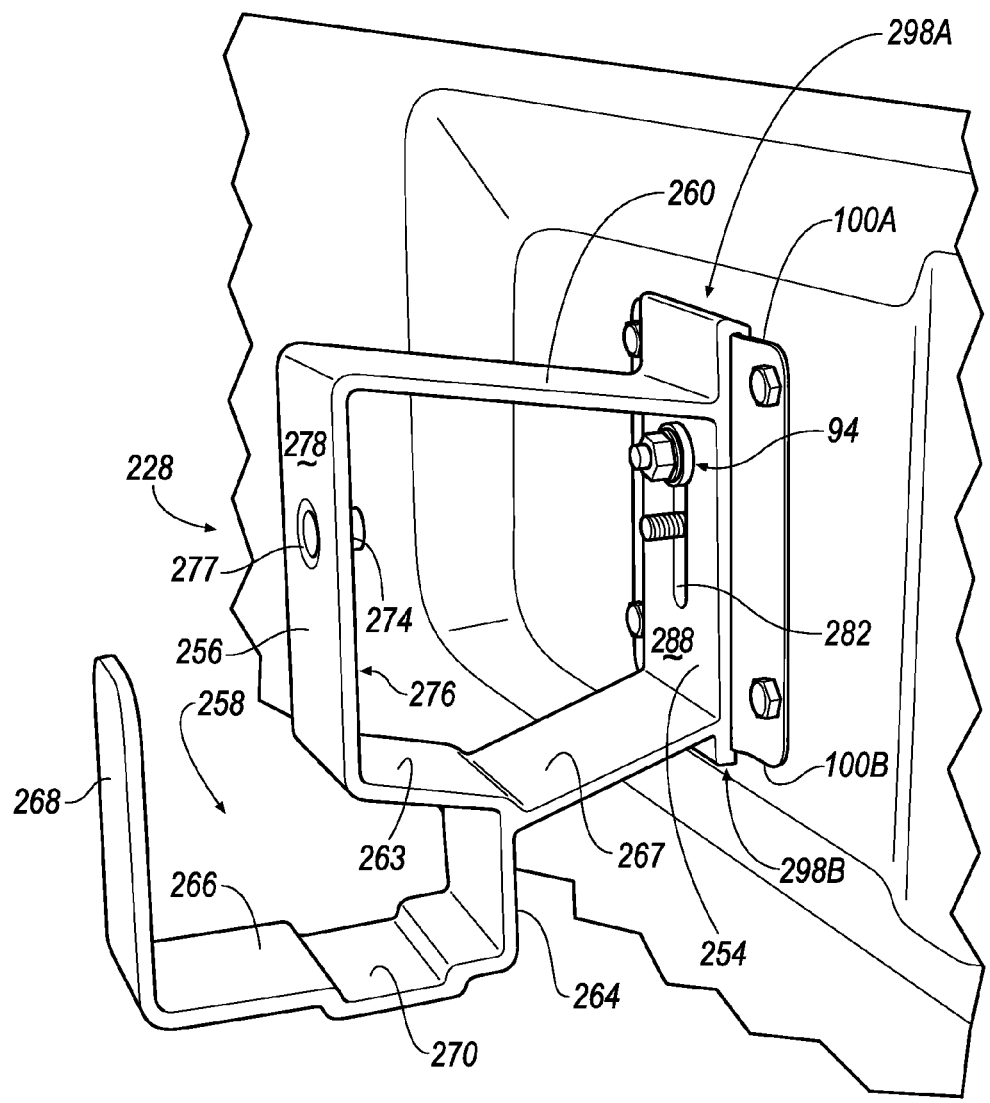
FIG. 7 a perspective view of the a second configuration of a ramp bracket for selectively storing a ramp member in a pick-up truck.

FIG. 7 is an alternative construction of a ramp bracket 228 that may be used with the mounting bracket 26. Ramp bracket 228 is similar to ramp bracket 28, but has a reduced overall height. More specifically, the ramp bracket 228 comprises a mounting plate 254, a support plate 256, and a retaining channel 258. The mounting plate 254 is secured to support plate 256 by a first connection member 260. The first connection member 260 is secured to a top edge of the support plate 265. Second and third connection members 262, 263, which are spaced from the first connection member 260, cooperate to connect the mounting plate 254 to the support plate 256. The retaining channel 258 is defined a member 264 that extends below the second and third connection members 62, 63, a support element 266 that extends from the member 264, and an upwardly extending retaining plate 268 that is connected to the support plate 266. The retaining plate 268 is arranged to be generally parallel to the support plate 256. The support element 266 may further include a locating groove 270 formed in the top surface of the support element 266. A portion of the ramp member 30 may be positioned within the locating groove 270.

A connection element 274 may be secured to a first face 276 of the support plate 256. An opening 277 is formed through the second face 278 and is in communication with the connection element 274. Connection element 274 cooperates with the fastening element 308 (best seen in FIG. 8) to secure the ramp member 30 to the ramp bracket 228, as will be discussed in further detail below.

The mounting plate 254 includes a slot 282 formed therethrough. As with the ramp bracket 28, the mounting plate 254 also cooperates with a locating element 84 and a securing element 86 that are secured to a mating key member 40. The locating and securing elements 84, 86 extend through slot 282 and extends past an inside surface 288 of the mounting plate 254. As discussed above, the securing element 86 includes a fastener, such as a screw 90, a washer 92 and a securing nut 94.

Fastening the ramp bracket 228 to the mounting bracket 26, operates in substantially the same way as fastening the ramp bracket 28 to the mounting bracket 26. More specifically, the securing nut 94 is loosened such that the mating key member 40 may be selectively slid along the slot 282 in the mounting plate 254. While the mating key member 40 is loosely connected to the mounting plate 254, the mating key member 40 is extended into the mounting keyway 34 of the mounting bracket 26. The mating key member 40 is then moved away from an engagement surface of the mounting plate 254 and slid upwardly along the slot 282, until the first mount member 46 is in an engagement position, i.e., at least partially out of alignment with the first open section 42 (as shown in FIG. 6). A first gripping lip 298A that is formed as part of the mounting plate 254 engages over a top edge 100A of the mounting bracket 26 and engages an inner surface of the mounting bracket 26. The gripping lip 298A extends outwardly from the engagement surface (similar to engagement surface 95 of the mounting plate 54) of mounting plate 254, forming a channel into which the mounting plate 54 extends. A second gripping lip 298B is also formed as part of the mounting plate 254, and engages over a bottom edge 100B of the mounting bracket 26 in a similar fashion as first gripping lip 298A. Once the mating key member 40 is in the engagement position, and the gripping lips 298A, 298B, are functionally engaging the top and bottom edges 100A, 100B of the mounting bracket 26, the securing nut 94 is tightened, thereby functionally securing the ramp bracket 228 to the mounting bracket 26.

Figure 8:
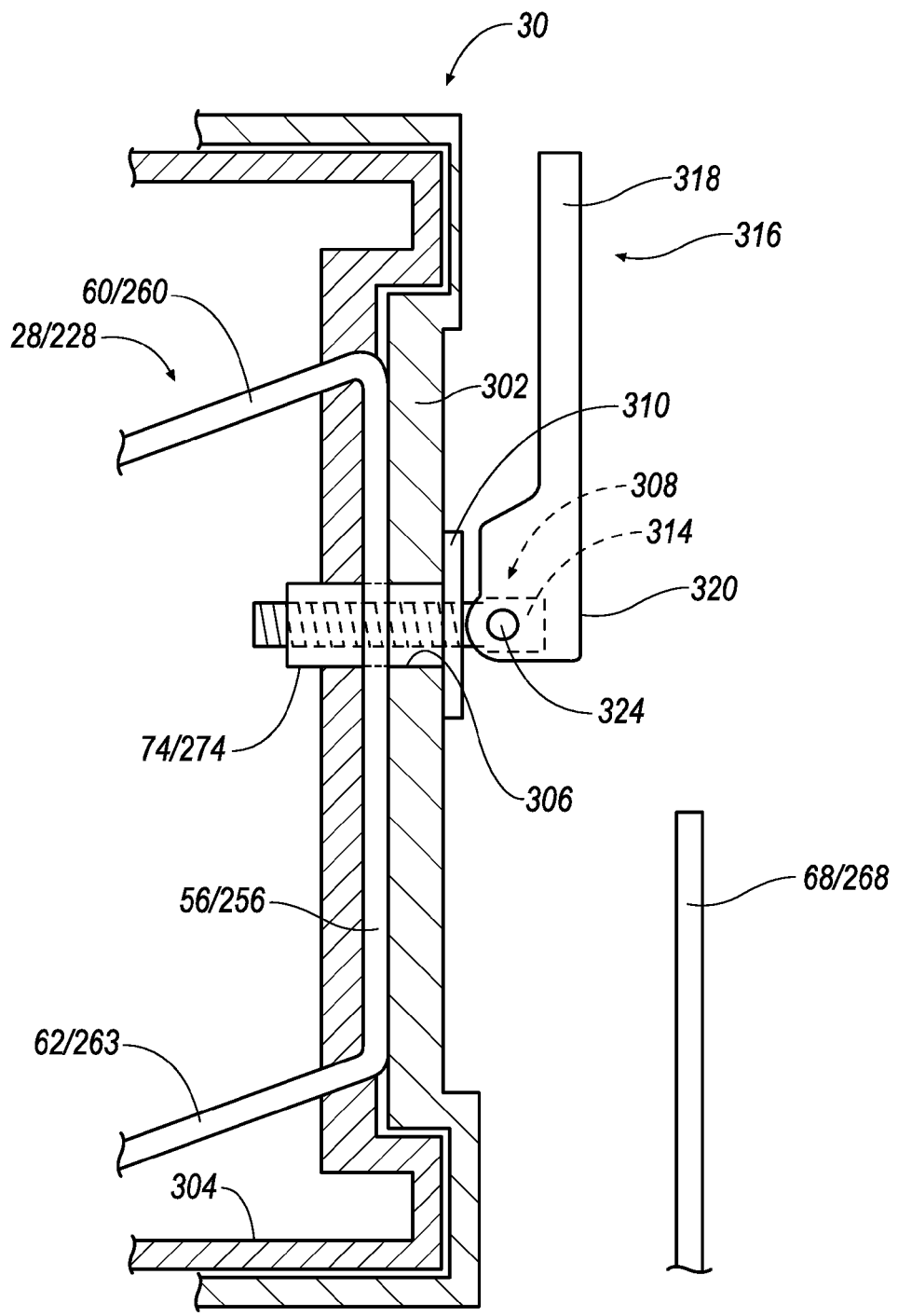
FIG. 8 is a partial cross-sectional view of a ramp member secured to a ramp bracket.

Referring to FIG. 8, attachment of a ramp member 30 to either ramp bracket 28 or 228 is illustrated. In one example, ramp member 30 includes first and second ramp sections 302, 304. Second ramp section 304 is selectively slidable with respect to first ramp section 302 to selectively expand the length of ramp member 30. In one example, first ramp section 302 may further include one or more attachment openings 306 that may be aligned with the opening 277 formed through the second face 78/278 of the support plate 56/256 of the ramp bracket 28/228. As discussed above, opening 277 is aligned with the connection member 74/274. While the above example only illustrates first ramp section 302 as having attachment openings 306, it is also contemplated that second ramp section 304 may also be provided with one or more attachment openings (not shown) that align with attachment opening 306 when in a storage configuration. A storage configuration is one in which the second ramp section 304 is fully positioned within the first ramp section 302.

Figure 9:
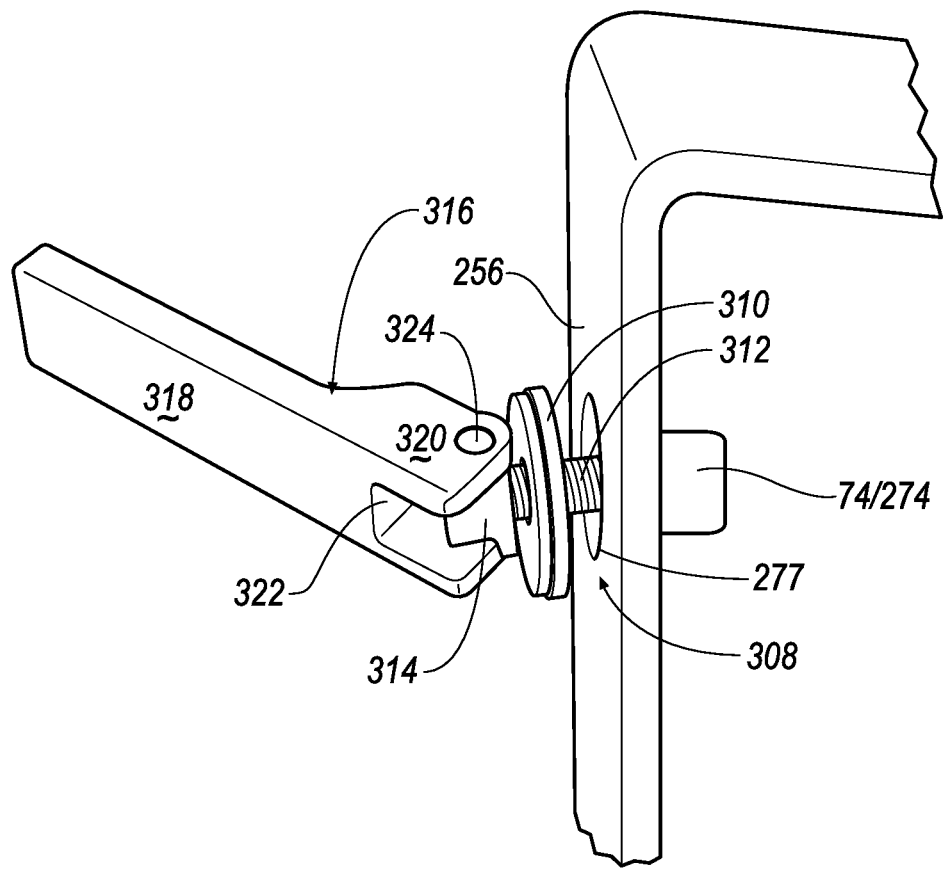
FIG. 9 illustrates an example of a fastener arrangement that operates to connect the ramp member to the ramp bracket.

Once the attachment opening 306 is aligned with the opening 277 on the support plate 56/256, a fastening element 308 is connected to the connection member 74/274. An example of a fastening element 308 is shown in greater detail in FIG. 9. Fastening element 308 comprises a washer element 310 and a screw member 312 that is configured to mating engage with connection member 74/274. A head member 314 of the screw member 312 may be operatively connected to a tool member 316.

In one exemplary arrangement tool member 316 includes a handle 318 that may grasped by a hand, and a connection end 320. The connection end 320 defines a mounting channel 322, into which the head member 314 of the screw member 312 is received. With the tool member 316 operatively connected to the head member 314, the tool member 316 may be operated to rotate the screw member 312 into engagement with the connection member 74/274. As shown in FIG. 8, when the first ramp section 302 is interposed between the support plate 56/256 and the washer element 310, rotating the tool member 316 in a first direction will serve to tighten the connection and secure the ramp member 30 to the ramp bracket 28/228. In this manner, the ramp member 30 will not become unintentionally damaged during transport. Rotating the tool member 316 in an opposite direction will serve to loosen the screw member 312 to enable separation of the ramp member 30 from the support plate 56/256.

It is understood that the specific tool member 316 illustrated herein is not required to positively secure the ramp member 30 to the support plate 56/256. Indeed, use of many other tools, such as a traditional socket wrench is also contemplated. However, to avoid the need to search for such tools and to ensure that ramp member 30 may be selectively secured or unsecured from a ramp bracket 28/228 at any time, in one example, tool member 316 may be permanently attached to head member 314. More specifically, a pin 324 is positioned through the head member 314, across mounting channel 322. With this connection, handle 318 may pivot between an actuation position (i.e, with handle 318 being generally coaxial with an axis extending through screw member 312) and a storage position (i.e., with handle 318 being generally perpendicular with the axis extending through the screw member 312), as shown in FIG. 8.

While ramp member 30 is shown as being positively attached to the support plate 56/256, it is also understood that ramp member 30 may be simply positioned within the retaining channels 58/258 of the pair of ramp brackets 28/258, without attachment to the support plate 56/256.

Figure 10A:
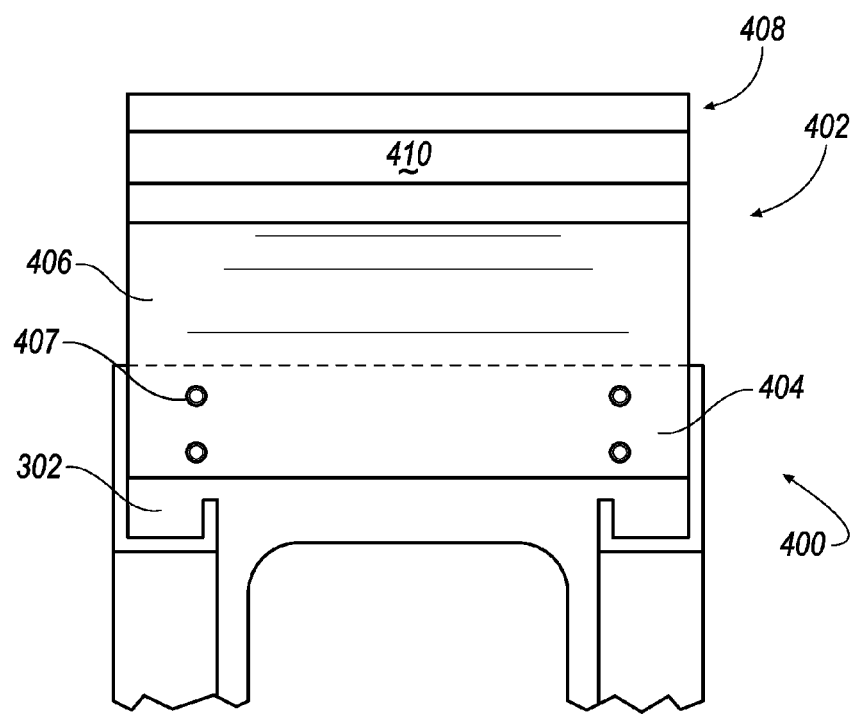
FIG. 10A is a partial bottom plan view of a connection end of a ramp member.
Figure 10B:
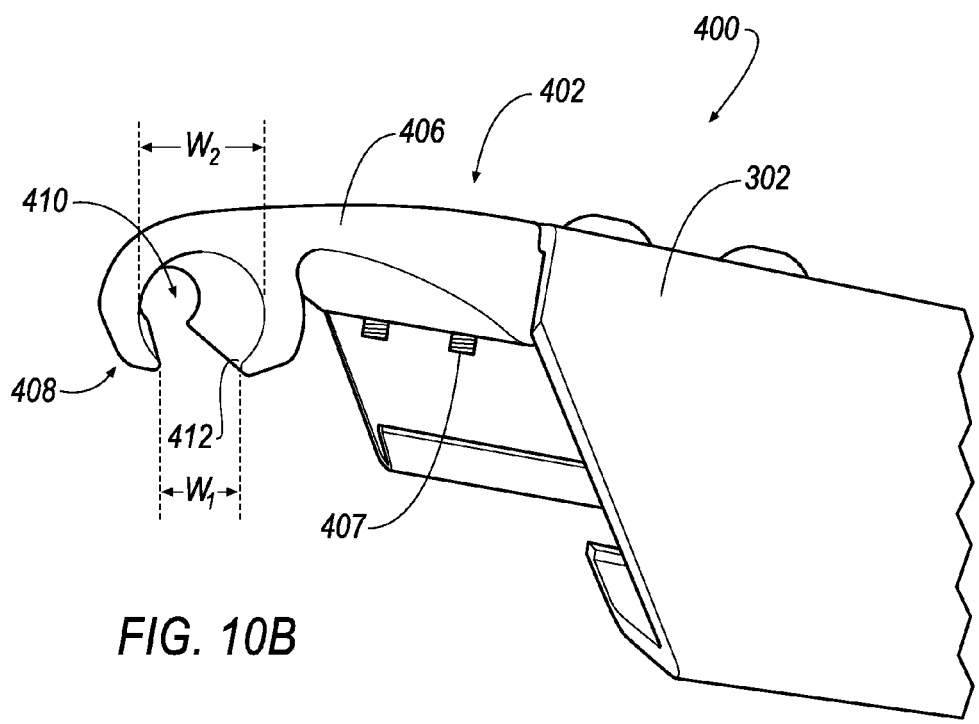
FIG. 10B is a partial side elevational view of the connection end of the ramp member of FIG. 10A.
Figure 12:
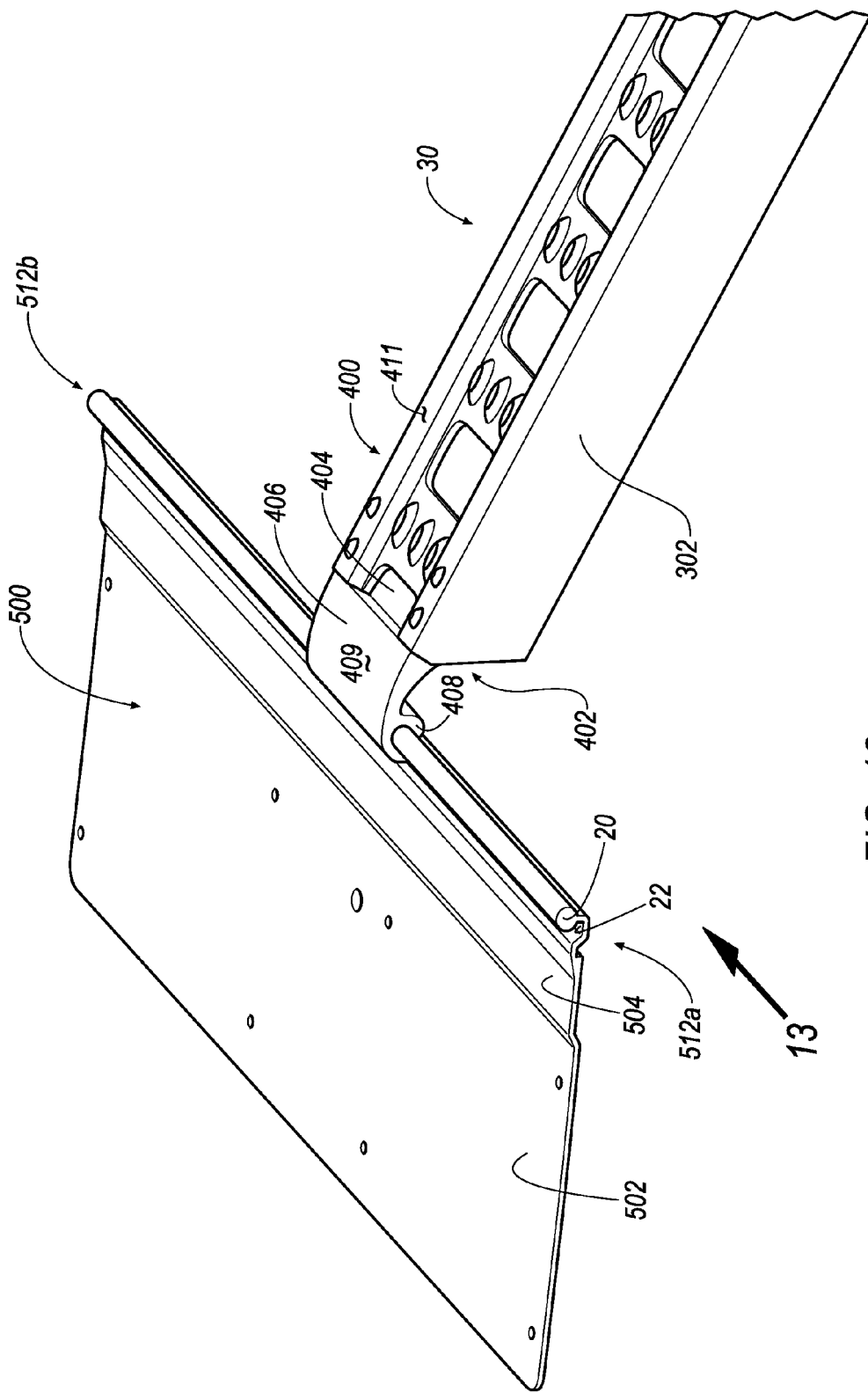
FIG. 12 is perspective view of the connection rail panel, unattached to the tailgate, illustrating the connection of the ramp member to the tailgate.

Referring to FIGS. 10A-10B, details of one or more ramp member 30 will now be described. Each ramp member 30 includes a connection end 400 to which a connector element 402 is fixed. The connector element 402 extends outwardly and away from the ramp member 30. Each connector element 402 comprises a mounting section 404, an arm member 406 that carries a generally C-Shaped connector 408. As best seen in FIGS. 10A and 12, the mounting section 404 is at least partially received within the first ramp section 302 and fixedly connected by fasteners 407. Mounting section 404 is provided with a reduced cross-sectional profile with respect to arm member 406. With this arrangement, arm member 406 may be arranged to have a top surface 409 that is substantially flush with a top surface 411 of the first ramp portion 302, as shown in FIG. 12. This arrangement will serve to create a relatively smooth ramp surface to the tailgate 12.

The C-shaped connector 408 further defines a mounting channel 410. An opening 412 defined by opposing ends of the C-shaped connector 408 provides access to the mounting channel 410. The opposing ends of the C-shaped connector 408 may be configured to taper inwardly toward the opening 412. A width $W_1$ of the opening 412, is substantially smaller than a width $W_2$ of the mounting channel 410.

Figure 13:
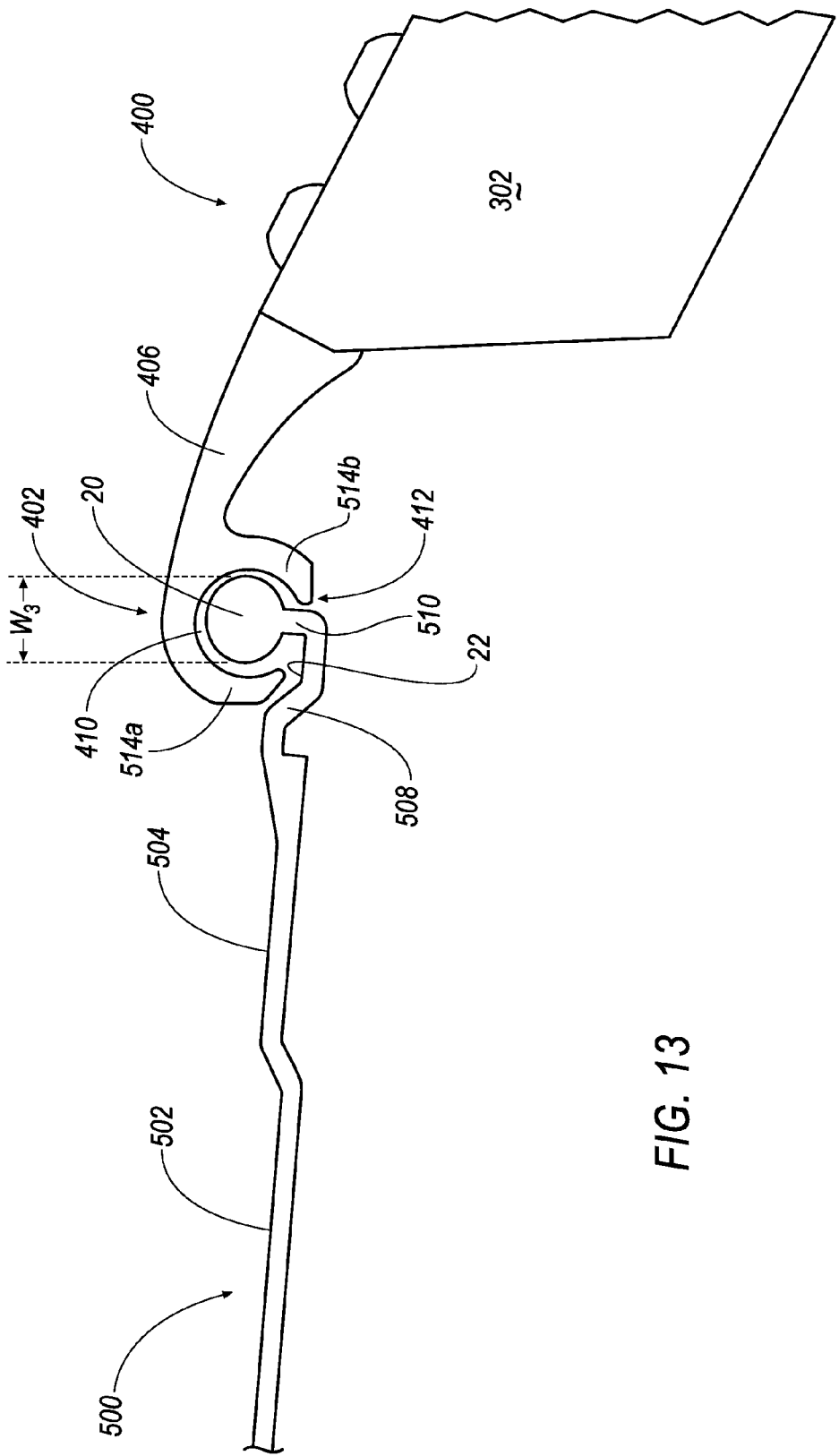
FIG. 13 is a partial cross-sectional view of a mounting plate of the connection rail panel, taken along lines 13-13 of FIG. 12, illustrating the connection of the ramp member to the tailgate.

The C-shaped connector 408 permits ramp member 30 to be selectively attached to connection rail 20. The connection rail 20 includes a cross-sectional shape that is complementary to the C-shaped connector 408. The connection rail 20 has a width $W_3$ that is larger than the width $W_1$ of the opening 412, but smaller than the width $W_2$ of the mounting channel 410. Referring to FIGS. 11-13, connection rail 20 is fixedly connected to a connection panel 500. The connection panel 500 comprises a main body section 502 connected to a raised section 504. The raised section 504 is connected to access groove 22. The access groove 22 is defined by a wall member 508 of the raised section 504 and a wall member 510 that is fixedly connected to the connection rail 20. The connection panel 500 and connection rail 20 may be formed as an integral member. The main body section 502 may be fixedly connected to a top surface of the tailgate 12 (with a fasteners), such that the connection rail 20 is positioned adjacent an end of the tailgate 12, as shown in FIG. 11.

To selectively connect each ramp member 30 to the connection rail 20, referring to FIG. 12, in operation, the C-shaped connector 408 is slid over the connection rail 20 on either end 512a, 512b of the connection rail 20 such that the connection rail 20 is disposed within the mounting channel 410 of the C-shaped connector 408. Referring to FIG. 13, once slid onto the connection rail 20, walls 514a/514b are disposed on either side of the connection rail 20. Indeed, the opening 412 defined by the end of the walls 514a, 514b is sufficiently narrow such that once slid onto the connection rail 20, the ramp member 30 cannot be disengaged from the connection rail 20 without sliding the connector element 402 off one of the ends 512a, 512b of the connection rail 20. More specifically, the end of the walls 514a, 514b are curved to complement the outer surface of the connection rail 20 so as to extend substantially around (i.e., greater than 60%) the connection rail 20, as illustrated in FIG. 13. With this arrangement, if the ramp member 30 is lifted upwardly, the end of the walls 514a, 514b will engage against the surface connection rail 20, thereby preventing the connection element 402 from being unintentionally separated from the connection rail 20. Thus, with this arrangement, the ramp member 30 has a stable connection that cannot become accidently dislodged from the tailgate 12.

Moreover, this arrangement also allows for a variety of ramp member 30 positions. More specifically, due to the complimentary relationship of the mounting channel 410 and the connection rail 20, the ramp member 30 may be pivoted with respect to the tailgate 12 such that the ramp member 30 may be positioned generally horizontal to the tailgate 12.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A ramp bracket assembly, comprising:
a mounting plate spaced away from and fixedly connected to a support plate by first and second connection members extending between the support plate and mounting plate, the mounting plate having a slot and a movable key member slidably secured within the slot that engages with a mounting bracket connectable to a vehicle sidewall; the mounting bracket having a central section that extends upwardly from a top surface of flange members positioned on either side of the central section; and
a retaining channel fixedly connected to the support plate and selectively receiving a ramp.

2. The ramp bracket assembly of claim 1, wherein the mounting plate further comprises at least one retaining lip that engages an outer surface of the mounting bracket.

3. The ramp bracket assembly of claim 2, wherein the mounting plate further comprises a pair of retaining lips disposed on either end of the mounting plate and wherein a first of the retaining lips engages over a top edge of the mounting bracket and wherein a second of the retaining lips engages over a bottom edge of the mounting bracket.

4. The ramp bracket assembly of claim 1, wherein the key member further comprises a securing element that retains the key member on the mounting plate and that selectively fixes the key member to the mounting bracket.

5. The ramp bracket assembly of claim 1, wherein the support plate further comprises a connection member that cooperates with a fastening element to selectively secure a ramp member to the support plate.

6. The ramp bracket assembly of claim 5, further comprising a tool member that is fixedly connected to a fastening element, wherein the tool member is operable in a first direction to cause the fastening element to selectively secure the ramp member to the support plate.

7. The ramp bracket assembly of claim 6, wherein the tool member may be pivoted between an actuation configuration and a storage configuration.

8. The ramp bracket assembly of claim 1, wherein the retaining channel is defined by a support element connected at one end to a retaining plate and connected at another end to a plate member that is connected to the support plate.

9. The ramp bracket assembly of claim 8, wherein the plate member extends from the support plate.

10. The ramp bracket assembly of claim 8, wherein the plate member extends from a connection member that connects the support plate to the mounting plate.

11. A ramp bracket assembly, comprising:
a pair of mounting brackets connectable to a vehicle sidewall, each mounting bracket having a central section that extends upwardly from a top surface of flange members positioned on either side of the central section, and wherein a keyway is positioned through the central section; and
a pair of ramp brackets, each ramp bracket comprising:
a mounting plate fixedly connected to a support plate, the mounting plate having a key that engages with the keyway and at least one retaining lip that engages an outer surface of the mounting bracket, the support plate having a connection member; and
a retaining channel fixedly connected to the support plate and receiving a ramp, the retaining channel cooperating with the connection member to selectively secure the ramp to the ramp bracket.

12. The ramp bracket assembly of claim 11, wherein the key is slidable with respect to a surface of the mounting bracket to frictionally engage the key to an inner surface of the mounting bracket.

13. The ramp bracket assembly of claim 12, wherein the key is slidably secured to the mounting plate by a securing element that extends through a slot formed through the mounting plate, wherein the securing element selectively fixes the key to the mounting bracket.

14. The ramp bracket assembly of claim 11, wherein the retaining channel is defined by a support element connected at one end to a retaining plate and connected at another end to a plate member that is connected to the support plate.

15. The ramp bracket assembly of claim 1, wherein the retaining channel further comprises a locating groove.

16. The ramp bracket assembly of claim 11, further comprising a connection member disposed on a front face of the support plate.

17. A ramp bracket assembly, comprising:
- a mounting plate that is spaced away from and fixedly connected to a support plate by first and second connection members that connect the support plate to the mounting plate, wherein the first connection member has a first end fixedly connected to the mounting plate and a second end fixedly connected to the support plate, a third connection member, wherein the second connection member has a first end fixedly connected to the mounting plate and a second end connected to a first end of the third connection member, and wherein the third connection member has a second end fixedly connected to the support plate; and
- the mounting plate having a slot and a movable key member slidably secured within the slot that engages with a mounting bracket connectable to a vehicle sidewall; and
- retaining channel which selectively receives a ramp, wherein the retaining channel is fixedly connected to the support plate.

* * * * *